Figure 1:
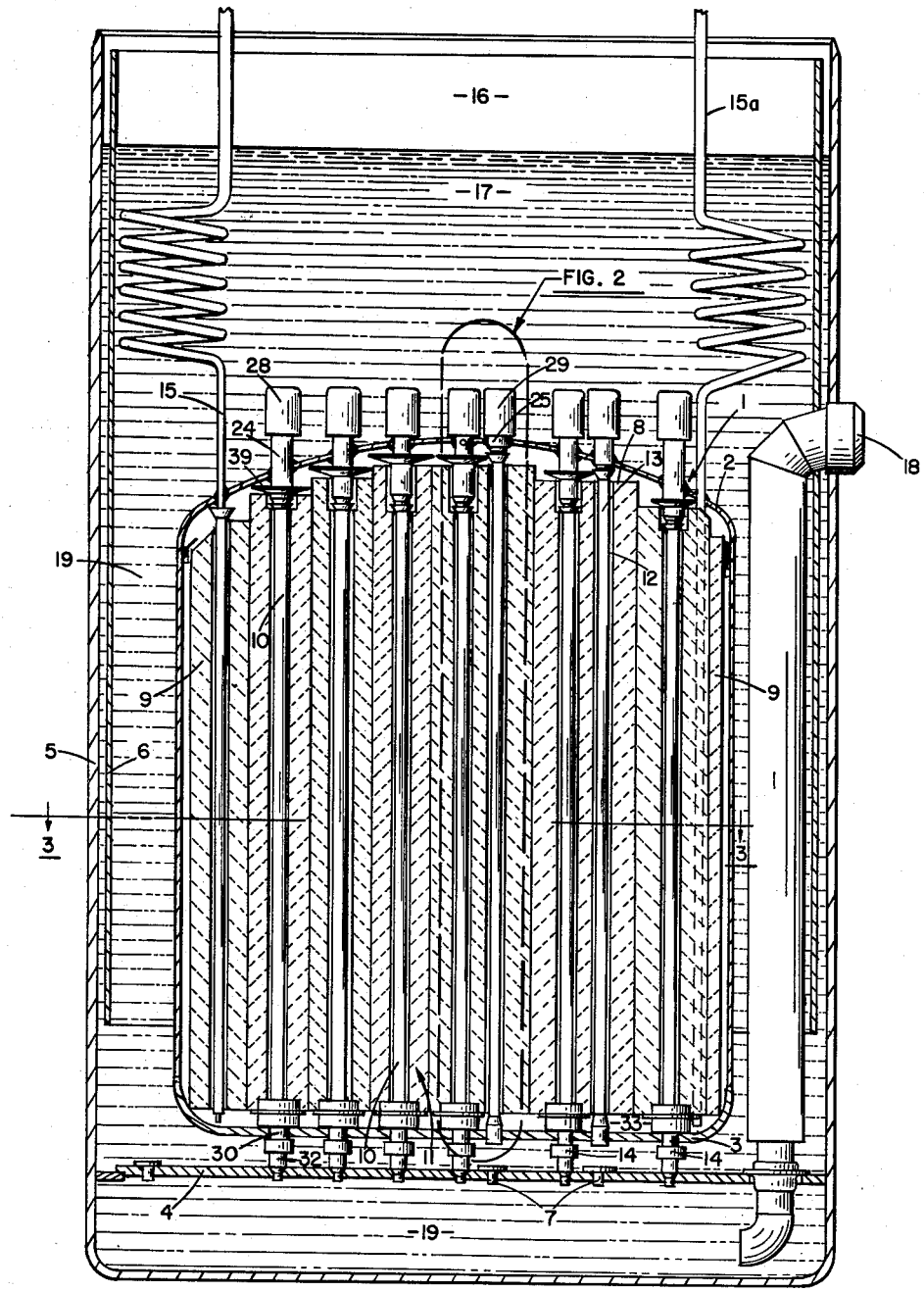

Feb. 11, 1964    R. M. PETERSON ETAL    3,121,052
CALANDRIA TYPE SODIUM GRAPHITE REACTOR
Filed Aug. 18, 1958    3 Sheets-Sheet 1

INVENTORS
JAMES E. MAHLMEISTER
WENDELL J. SANDERS
ARDELL C. WILLIAMS
ROBERT M. PETERSON
NORRIS E. VAUGHN
BY
Gerald A. Koris
ATTORNEY INVENTORS
JAMES E. MAHLMEISTER
WENDELL J. SANDERS
ARDELL C. WILLIAMS
ROBERT M. PETERSON
NORRIS E. VAUGHN
BY
Gerald A. Koris
ATTORNEY F : FUEL ELEMENT
C : CONTROL ELEMENT
S : SAFETY ELEMENT
EF: EXTRA FUEL ELEMENT OR CENTER DUMMY
D : CORNER DUMMY OR EXTRA EXPERIMENTAL ELEMENT INVENTORS
JAMES E. MAHLMEISTER
WENDELL J. SANDERS
ARDELL C. WILLIAMS
BY ROBERT M. PETERSON
NORRIS E. VAUGHN

ATTORNEY

United States Patent Office 3,121,052
Patented Feb. 11, 1964

3,121,052
CALANDRIA TYPE SODIUM GRAPHITE REACTOR
Robert M. Peterson, Woodland Hills, James Earl Mahlmeister, Granada Hills, Norris E. Vaughn, Reseda, Wendell J. Sanders, Van Nuys, and Ardell C. Williams, Canoga Park, Calif., assignors, by mesne assignments, to the United States of America as represented by the United States Atomic Energy Commission
Filed Aug. 18, 1958, Ser. No. 757,173
7 Claims. (Cl. 176—52)

Our invention relates to an improved sodium graphite-type nuclear power reactor, and more particularly to a calandria-type core structure for such a reactor.

For detailed information on sodium graphite reactors, reference is made to the "Proceedings of The International Conference on Peaceful Uses of Atomic Energy," to the papers in volume 3 therein of W. E. Parkins, "The Sodium Reactor Experiment"; C. Starr, "Sodium Graphite Reactor 75,000 Electrical Kilowatt Power Plant"; and S. Siegel et al., "Basic Technology of Sodium Graphite Reactors."

It may be seen in the paper on "The Sodium Reactor Experiment" (SRE), FIGURE 9, that the core structure of this reactor comprises a plurality of hexagonal graphite moderator blocks sheathed in zirconium cladding, each block or "can" having a central process channel in which the fuel element is positioned. The graphite is clad with zirconium or other protective metal to prevent contact of the graphite with the sodium coolant. Such contact would result in the absorption of sodium into the pores of the graphite, in serious dimensional changes, and in reduced neutron economy. The reason for individual canned moderator elements of previous designs was to limit the amount of damage in the event of failure of any of the cladding. The large amounts of protective cladding required a metal of relatively low thermal neutron absorption cross-section in order to reduce uranium enrichment. Zirconium metal was chosen as the cladding principally because of its low cross-section, although other materials, such as stainless steel, have better metallurgical characteristics at high temperatures. However, zirconium is very expensive and the fabrication and cladding of the graphite added further to the cost. Even though zirconium has a relatively low thermal neutron absorption cross-section, it is still a principal neutron absorber in the reactor core, and has its deleterious effect on the neutron economy of the system, resulting in higher fuel costs. Another factor leading to poorer neutron economy with the canned moderator is the presence of cladding metal at the edges of the cans, and of sodium (for moderator cooling) in the small space between the cans. In the SRE, this region has the highest thermal neutron flux, and neutron absorption is consequently greater.

An object of our present invention, therefore, is to provide an improved sodium graphite reactor.

Another object is to provide such a reactor with an improved core structure.

Another object is to provide an improved core for a sodium graphite reactor which avoids canning of each individual moderator element.

Another object is to provide a calandria-type core for a sodium graphite reactor.

Still another object is to provide in such a calandria core means for prevention of leaks.

Yet another object is to provide means in such a calandria core for the accommodation of leaks and removal of leaked sodium without damage to the core structure.

A further object of our invention is to reduce thermal stresses resulting from rapid temperature fluctuations in the reactor core upon sudden shutdown or power changes.

A still further object is to design and place core structural material in such a reactor in a region of relatively low thermal neutron flux.

Other objects and advantages of our invention will become apparent from the following detailed description taken together with the accompanying drawings and the attached claims.

Figure 2:
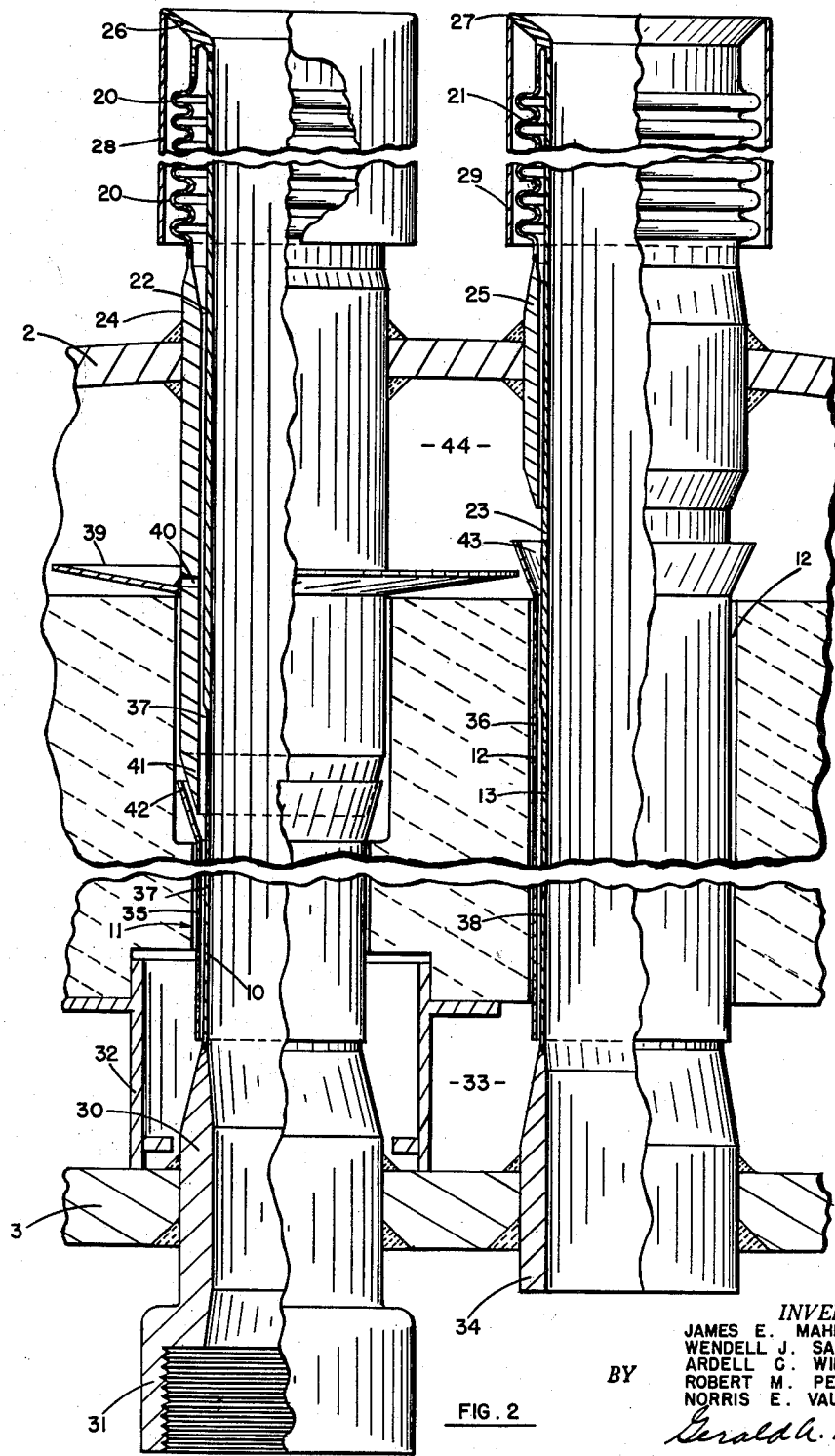
Figure 3:
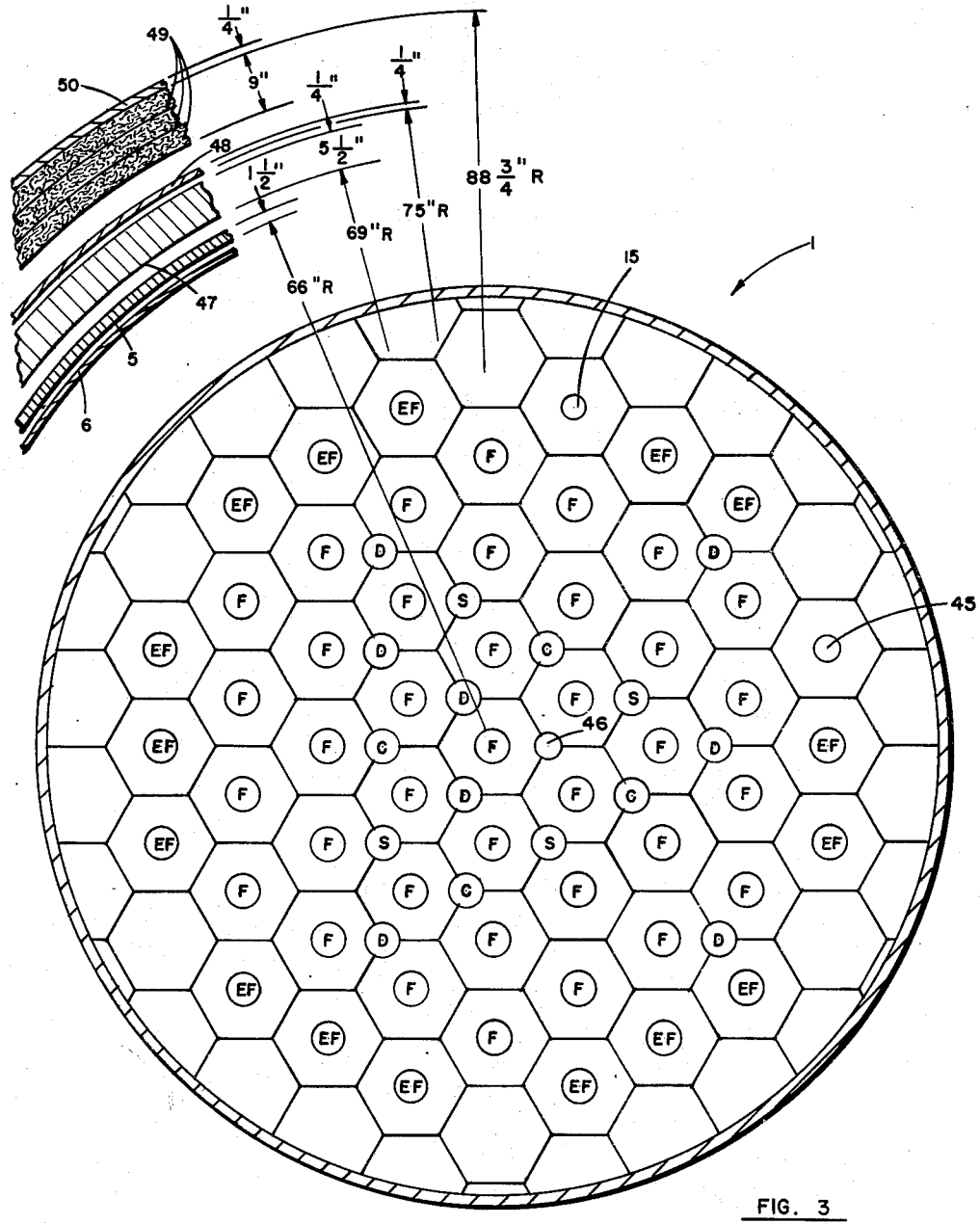

In the drawings, FIGURE 1 is an elevation view of our core structure, FIGURE 2 is an enlarged portion of FIGURE 1, partly in section, and FIGURE 3 is a core section, partly schematic, showing the core loading pattern.

Our invention incorporates a single core vessel with uncanned graphite moderator and has a plurality of metal process tubes which penetrate the graphite and the vessel, giving an overall calandria configuration to the core. The fuel elements are positioned in the process tubes and the sodium flows therethrough from a plenum below the calandria shell to a sodium pool above it. Except for the process tubes and a protective sleeve, the graphite is uncovered. The large decrease of structural material for this design over the canned graphite of the SRE results in improved neutron economy and simpler fabrication, leading to considerable cost savings. The metal present is directly adjacent the fuel elements and is in a position of higher energy neutron flux and of consequently relatively lower thermal neutron flux. Since lower absorption cross-sections are exhibited at higher neutron energies, neutron loss is decreased. The one apparent advantage of the conservative separate can design is that in the event of can rupture, only one can will be flooded with sodium, while with an uncanned moderator, an uncontrolled rupture in a process tube might ruin the entire core. Our design, then, has additional features, discussed below, directed toward preventing a process tube rupture and minimizing the effects of any that might occur.

The following description of an embodiment of our invention is made with particular reference to the SRE. The core structure to be described is a replacement for the present SRE canned moderator core structure. Except for the core structure, the remaining features of the SRE—fuel elements, control and safety rods, reactor vessel, grid plates, process and instrumentation systems, etc.—are identical and serve exactly the same function with the new core. Although for purposes of illustration the SRE structure is referred to, it should be understood that this is only by way of illustration and is not restrictive, since our invention is not limited to any particular fuel cycle, core structure, or system external to the reactor core.

Turning now to FIGURE 1, the calandria tank 1 is a vertical, type 304 stainless steel shell, 102 inches diameter and 114 inches height, with a torospherical head 2, which is convex upward, and with a disc bottom plate 3. The bottom plate 3 is 1¼ inch thick, and the remainder of the tank is ½ inch thick. Tank 1 is connected with the existing SRE grid plate 4 which is fastened to the core tank 5 with its core liner 6. Existing grid plate holes not used with the calandria core are stopped with plugs 7. The calandria tank 1 contains hexagonal uncanned graphite columns 8 stacked vertically side by side. Graphite prisms 9 of irregular polygonal cross-section are proportioned to fit between the outer row of hexagonal columns 8 and calandria tank 1. The top torospherical shell 2 and the bottom plate closure 3 serve, in effect, as "tube sheets" for process tubes 10 which penetrate the core. The fuel process tubes extend completely through the core from bottom to top in process channels 11 and are arranged on an equilateral triangular spacing. The cross-flats dimensions of hexagonal columns 8 is made equal to the distances between fuel channel process tubes centers so that each process tube coincides with the graphite column axis. Additional process channels 12 and the process tubes 13 are provided midway between some of the fuel process channels 11, for reactor control and safety rod thimbles which are positioned in the tubes 13. The control and safety channels 11 are located at corner edges of graphite columns 8, the corners edges of three such columns meeting to form a process channel on a triangular pitch pattern which is superimposed upon the hexagonal pattern of the fuel process channels 11. The fuel process tubes 10 are attached by grid plate connectors 14 to the SRE grid plate 4 in the manner described below, while control element channels 12, which do not have the same cooling requirements, are not joined to the grid plate.

A vent line 15 and a separate pump-out line 15a, similar to the vent line, penetrate the core parallel the process tubes. The vent line may be used to pressure or vent the calandria tank to the helium or other inert gas atmosphere 16 above the top sodium pool or plenum 17 as desired. Normally, the pressure inside the calandria is not varied so the structural loading on the tank head 2 is due to the hydrostatic pressure. Venting of the core serves a safety function since in the event of any sodium leaks, a greater exterior pressure may be applied which will serve to prevent out-leakage of the sodium. The venting system is one of four devices, the others to be discussed below, which we have provided to prevent or minimize the effects of any leaks.

Sodium coolant enters the core tank through the existing primary sodium inlet line 18, into a lower core tank plenum 19 below grid plate 4. It flows through process tubes 10 to upper sodium plenum 17 where it is withdrawn through the existing outlet line, which is positioned below the top of sodium plenum 17 a short distance behind inlet line 18. The annular volume between calandria 1 and core tank 5 is filled with stagnant sodium. The sodium is stagnated by a series of baffles (not shown) placed in the annulus. Cooling of the safety thimbles in process channels 12 is provided by free convection flow since essentially no pressurization occurs under calandria tank 1.

Turning now to FIGURE 2 for details of the process channels, the process tubes 10 and 13 are 3 inches in diameter. They are provided at their upper end with convoluted metal bellows 20 and 21. The bellows allow process tube contraction and expansion associated with start-up, shutdown and changing power operations. During such periods relatively great temperature changes occur over the core, which might otherwise cause severe thermal stresses. The bellows 20 and 21 are welded at their upper ends to the process tubes 10 and 13 which extends through top plate 2. The top ends of the process tubes are equipped with lengths of heavier tubing 22 and 23. The bellows are attached at their lower end to nozzles 24 and 25 which are welded into the top plate 2 and extend into the graphite. Process tubes 10 and 13 are also fitted at their tops with cone-shaped pieces 26 and 27 which guide the entrance of fuel and safety rods during the installation. Cylindrical shrouds 28 and 29 surround bellows 20 and 21 and serve to prevent sudden contact of the tubes with the bellows and calandria shell structure; the sodium instead mixes with the sodium pool 17. These features protect the process tubes from the severe thermal stresses and shocks associated with the high heat transfer rates of liquid metals.

The lower end of process tubes 10 are welded into nozzles 30 which extend through the calandria bottom plate. The nozzles 30 have threaded joints 31 which connect with grid plate connectors 14 (FIG. 1) and the welded to bottom plate 3. The connectors have adjustable features, using a swivel-type joint, which allow radial, rotational and axial movement to be made during alignment of the calendria on the grid plate. These adjustments are made with a concentric tube, torque wrench which is operated from the reactor floor level during initial installation of the calandria, when the calandria tank is located over the grid plate supported by the SRE bridge crane. Drift pins (not shown) extending through the process tubes, are used for initial engagement between the connectors and the grid plate.

Each graphite column is supported loosely on a pedestal 32 resting on the bottom closure plate 2, thus providing a space or plenum 33 between the bottom plate 2 and the bottom end of the graphite columns, the purpose of which is discussed below. The nozzles 30 extend upward through graphite supporting pedestals 32 a short distance into the bottom of the graphite column 8, thus providing not only a means for accurately locating the lower end of the column, but also added strength to resist transverse forces. The control and safety rod tubes 13 are not attached to the grid plate, and their top and bottom nozzles 25 and 34 are shorter, bottom nozzle 34 terminating in calandria shell bottom plate 2.

The calandria tank is designed as a leak-tight vessel. However, we have provided features to handle a moderate amount of sodium in the event of a leak adjacent to the process tubes 10 and 13 or in the top head 2. These features are essential to prevent poisoning of the graphite by any sodium leakage, and they justify the simplicity and economy of our uncanned graphite core. Among the features to prevent leakage, the venting system was discussed previously. The inside surfaces of the graphite in the process channels 11 and 12 are lined with a thin (e.g., 20 mils) lining or sleeve 35 and 36 of a metal which is resistant to corrosion by sodium and is of relatively low thermal neutron absorption cross-section. This would preferably be zirconium, or its alloys such as zircalloy II; Inconel, molybdenum, titanium, or stainless steel could also be used. Similarly the same metals could be used for the process tubes, bellows and other core structural materials, with stainless steel, especially the 300 series such as types 304 and 307 being preferred. Any sodium leakage is directed into the narrow annuli 37 and 38 formed by liners 35 and 36 and the process tubes 10 and 13 and then to plenum 33. In the particular application plenum 33 is three inches in height and has a hundred gallon capacity. A one-inch pump-out line, similar to vent line 15 is provided, which allows intermittent pumping of sodium to the outside of the core chamber.

The graphite logs containing fuel process channels 11 are roofed with stainless steel trays 39 which are welded to upper nozzles 24. The trays would catch any sodium penetrating tank head 2, preventing the sodium from reaching the top layer of graphite. The sodium would then pass through a drain hole 40 and directed into annulus 37. The end piece 41 of nozzle 24 passes inside the top, funnel-shaped portion 42 of liner 35. Since safety element channels 12 are positioned between fuel channels 10, space restrictions require a smaller, funnel-shaped tray 43, which is directly joined to sleeve 36. The sodium accumulated in the bottom plenum 33 of the calandria is pulled out of the plenum into a vacuum drain tank. As a suitable alternate, or addition to, the separate trays 34 and 43 for each process tube, a single roof sheet may be used. This sheet would be positioned just under tank head 2 and be adapted to direct sodium leakage to the edge of the tank 1, and down its side into the plenum 33. This would be particularly satisfactory for a large leak which might overload the trays. The space 44 between head 3 and the top of the graphite logs 8 is filled with helium or other inert gas at the same pressure as the gas 16 above the top sodium pool.

To still further protect the reactor core in the case of leakage in any single process tube, the process tube could be sealed off. The upper and lower ends of the process channel would be sealed by a wedge-plug device which would effectively isolate the thin-wall process tube and bellows so that reactor operation could be continued, despite the non-productive cell. A number of these could be allowed within the limits of available reactivity.

To summarize, our invention is based on an uncanned moderator calandria design, with resulting structural simplicity and economic savings. Maximum protection of graphite from the sodium is achieved with bellows, protection of the bellows with shrouds, seamless bellows blanks and process tubes, and upset ends on the bellows and process tubes to allow for thicker material at all points where welds are required. Assuming that a leak does develop, protection of the graphite is further accomplished by the "roofing" trays over the graphite, lining the graphite with a metal liner, and channeling the sodium flow to a plenum below the graphite, where it can be pumped out. Also, the ability to pressurize the calandria vessel would minimize any leak. As a last resort, process tubes may be sealed off individually and the reactor will continue to operate.

The calandria core substitute for the SRE would use the present SRE fuel element. These elements are in the form of ¾ inch rods arranged in a seven-rod cluster. Each rod is wrapped with a 0.019 inch diameter stainless steel wire. There is 0.009 inch NaK thermal bond between the fuel rods and the stainless steel tube. The fuel is 2.78 weight percent enriched uranium metal, although other fuels such as uranium oxide and alloys such as thorium-uranium and molybdenum-uranium could also be used. Similarly, the fuel element could take different configurations, examples being hollow single or concentric tubes.

The fuel elements are placed in the center of each hexagonal graphite block at 11 inch centers. For reactor operation, the core loading constitutes 37 such fuel elements, four control elements, four safety elements, one neutron source, sixteen extra fuel elements for dummy channels, corner dummy or extra experimental elements, one vent line, and one sodium pump-out line. The 37 fuel element loading gives a power rating of 20 mw. (thermal) at sodium inlet and outlet temperatures of 500° F. and 960° F. The extra fuel element channels are filled with graphite plugs. (It is possible to load as many as 51 fuel elements with correspondingly thinner radial reflectors.)

The positions occupied in the core by each fuel element, control element, and safety element are shown in FIG. 3, a section through FIG. 1, which is partly schematic to show SRE core structure. In addition to fuel elements, we see pump-out line 45, vent line 15, neutron source 46, core tank liner 6, core tank 5, thermal shield 47, outer tank 48, thermal insulation 49, and core cavity liner 50. The fuel element channel is 3.200 inch diameter (cold) and 3.210 inch diameter (hot). The zirconium process channel liners are 30 mils thick and 3.080 inch I.D. (cold) and 3.093 inch I.D. (hot). The process tube wall is 20 mils thick type 304 stainless steel, and 2.805 inch I.D. (cold) and 2.825 I.D. (hot). The fuel elements are placed in the process tubes in individual hexagonal graphite blocks, the process tubes being at a distance of 11.000 inch (cold) and 11.075 inch (hot).

The volume fractions occupied by various materials for a single unit cell (1 hexagonal graphite block with a central process channel, zirconium liner, stainless steel process tube and 7 rod SRE fuel element) are shown below in Table I.

TABLE I

*Volume Fractions for Reference Unit Cell*

| Material | Volume Fraction |
|---|---|
| 7 Fuel rods | 0.0299 |
| NaK | 0.0008 |
| Stainless steel: | |
|   7 rods (wire and cladding) | 0.0022 |
|   20 mil process tube | 0.0017 |
|   Corner channels (17 prorated over 37 cells) | 0.0009 |
| Sodium | 0.0260 |
| Zirconium: | |
|   Lining hole for process tube | 0.0005 |
|   Corner channels (17 prorated over 37 cells) | 0.0002 |
| Graphite | 0.8720 |
| Void space: | |
|   Annulus between zirconium sheath and process tube | 0.0108 |
|   Annulus between zirconium sheath and graphite | 0.0009 |
|   17/37 of one corner channel | 0.0382 |
|   Graphite spacing between cells | 0.0160 |
| | 1.000 |

The pertinent nuclear characteristics of the materials employed in the calandria core are given below in Table II.

TABLE II

*Nuclear Data*

Reactor power—$20 \times 16^6$ watts
Enrichment $$\frac{N_{25}}{N_{25}+N_{28}} = 0.02815 \ (2.78 \text{ w/o})$$

Macroscopic equilibrium zenon and samarium poison cross section $$\Sigma_a(\text{poison}) = 0.013 \text{ cm.}^{-1}$$

| Material | Cross Sections (1,000° C. Neutron Temp) | |
|---|---|---|
| | Absorption (barns) | Scattering (barns) |
| $U^{235}$ | 269 | 10.0 |
| $U^{238}$ | 1.170 | 8.3 |
| Graphite | 0.002 | 4.8 |
| Sodium | 0.213 | 3.5 |
| Stainless Steel | 1.250 | 9.8 |
| Zirconium | 0.082 | 8.0 |
| Potassium | 0.838 | 1.5 |

The lattice constants for a five-region cylinderized model of the reference unit cell are listed below in Table III.

TABLE III

*Lattice Constants for Cylinderized Unit Cell*

(7-ROD SRE FUEL ELEMENT-CALANDRIA CORE)

$\eta$ (neutron multiplication factor) — 1.728.
$\epsilon$ (fast fission factor) — 1.0423.
$p$ (resonance escape probability) — 0.800.
$f$ (thermal utilization) — 0.909.
$k_\infty$ (infinite lattice multiplication factor) — 1.309.
$\Sigma^a$ (macroscopic absorption cross section) — 0.005698 cm.$^{-1}$.
$L^2$ (squared thermal diffusion length) — 1870 cm.$^2$.
$D_{th}$ (thermal diffusion coefficient) — 1.063 cm.
$\tau$ (Fermi age) — 412 cm.$^2$.
$D_f$ (fast diffusion coefficient) — 1.143 cm.
$B^2$ (materials buckling) — $130 \times 10^{-6}$ cm.$^{-2}$.

The first and third regions contain fuel and the fifth contains graphite. With the 37 fuel element loading, these nuclear characteristics and the fuel loading pattern shown in FIG. 3, the K effective range is 1.040 to 1.055, which results from the increased neutron economy feature of our invention. With this loading the average flux in the fuel at 20 megawatts is approximately $1.14 \times 10^{13}$ neutrons per centimeter square per second. The large increase in K infinity to 1.309 with respect to the SRE value K infinity of 1.275 is due to the net increase in the thermal utilization in the present design.

Although our invention has been described in particular reference to an embodiment developed as a replacement for the SRE, using to as great extent as possible the existing SRE structure, this was only for purposes of illustration. Our calandria-type sodium graphite reactor core is suitable for sodium graphite reactors of different sizes and configurations, using different structural materials, fuel elements, and external systems. The basis of our invention lies in the design of a relatively simple core structure with uncanned graphite, which avoids the use of costly structural materials for protection of the graphite from the sodium coolant, and in the means for preventing or minimizing sodium leaks in such a system. Therefore, our invention should be understood to be limited only as is indicated by the appended claims.

We claim:

1. A sodium graphite reactor core structure comprising a core tank, unclad graphite moderator disposed in said tank, a plurality of parallel, longitudinal process channels in said graphite, process tubes traversing said core tank positioned in said process channels, means for sealing said tubes at their ends to said core tank, said tubes being adapted for the passage of sodium therethrough, a protective sleeve positioned around each process tube and between each of said tubes and said graphite, said process tubes and said sleeves defining annular spaces, fuel elements positioned in said process tubes, a sodium coolant surrounding said core tank and filling said process tubes, the bottom portions of said graphite and of said core tank defining a leakage plenum, said annuli communicating with said plenum, and means for removing sodium leakage from said plenum.

2. A sodium graphite power reactor core structure comprising a core tank, unclad graphite moderator positioned in said tank, a plurality of parallel, longitudinal process channels in said graphite, a plurality of process tubes traversing said tank positioned in said process channels, bellows connected to said core tank with one end each of said process tube outside said core tank, means sealing the other end of said tubes to said core tank, a sleeve for each of said process channels positioned between and spaced from said graphite and said process tubes, said liners and said process tubes defining annular spaces, fuel elements positioned within said process channels, sodium surrounding said core tank and said fuel elements, the bottom portions of said graphite and of said core tank defining a leakage plenum, said annuli communicating with said plenum, means for removing sodium leakage from said plenum, and means for adjusting the pressure within said core tank.

3. A sodium graphite nuclear reactor core structure comprising a reactor tank, unclad graphite moderator disposed in said tank, a plurality of parallel process tubes traversing said tank through said graphite, bellows connected to said core tank and with one end of each of said process tubes outside said core tank for axial expansion and contraction thereof means sealing the other end of said tube to said core tank, the bottom portions of said graphite and of said tank defining a leakage plenum, sleeve means positioned between each of said process tube and said graphite, said sleeves and said process tubes defining annular spaces communicating with said leakage plenum, the top portions of said graphite and of said core tank defining a gas space, drip trays positioned in said gas space communicating with said annuli, a plurality of fuel elements positioned in said process tubes, and sodium surrounding said core tank and each of said fuel elements.

4. A nuclear reactor core structure comprising a core tank, unclad graphite moderator disposed in said tank, a plurality of longitudinal, parallel process channels in said graphite, sleeves lining said graphite in each channel, a process tube positioned in each channel traversing said core tank, fuel elements positioned within said process tubes, sodium surrounding said core tank and each of said fuel elements, said process tubes and said sleeves defining annular spaces, bellows connected with one end of each of said process tubes outside said core tank, means sealing the other end of said tubes to said core tank a shroud enclosing each said bellows, the bottom portions of said graphite and of said core tank defining a leakage plenum, said annuli communicating with said plenum, the top of said graphite and of said core tank defining a gas space, drip trays positioned on top of said graphite in said gas space communicating with said annuli, a pump-out line communicating with said leakage plenum for withdrawing sodium from said core tank, and means for regulating pressure within said core tank.

5. A sodium graphite nuclear power reactor comprising a core tank, unclad graphite moderator positioned in said core tank, a plurality of parallel process tubes longitudinally traversing said core tank through said graphite, fuel elements in said process tubes, bellows connected with a first end of each process tube outside said core tank, the bottom portions of said graphite and of said core tank defining a leakage plenum, means for directing sodium leakage into said plenum, a pump-out line communicating with said plenum for removing sodium leakage from said core tank, means for regulating the pressure within said core tank, a reactor tank containing sodium, a grid plate positioned in said reactor tank, said core tank assembly being positioned on said grid plate beneath the level of sodium in said tank so that said core tank is surrounded by sodium and said process tubes contain sodium, said grid plate and the bottom said reactor tank defining a lower plenum, the second end of each of said process tubes communicating with said plenum and being sealed to said core tank, a sodium inlet line in said reactor tank communicating with said lower plenum, a sodium outlet line in said reactor tank communicating with the sodium above said grid plate.

6. A sodium-graphite nuclear power reactor comprising a core tank with a hemispherical head, unclad graphite moderator disposed in said tank, a plurality of parallel, longitudinal process channels in said graphite, a process tube in each said process channel, said process tubes traversing said core tank, fuel elements disposed in the majority of said process tubes, sleeves lining the surfaces of said graphite in each of said process channels, said sleeves and said process tubes defining annular spaces, the bottoms of said graphite and of said core tank defining a leakage plenum, said annuli communicating with said plenum, the top portions of said graphite and of said core tank defining a gas space, drip trays positioned in said space communicating with said annuli, a pump-out line communicating with said plenum for withdrawal of sodium leakage from said core tank, a vent line for adjusting pressure within said core tank, a reactor tank substantially filled with sodium, a grid plate positioned in the lower portion of said reactor tank, said core tank assembly being positioned on said grid plate, said grid plate and the bottom portion of said reactor tank defining a lower plenum chamber, said process tubes communicating with said lower plenum, a sodium coolant inlet line in said reactor tank communicating with said lower plenum, a sodium coolant outlet line communicating with sodium coolant leaving said core tank after passage through said process tubes.

7. A nuclear reactor core structure comprising a reactor tank, sodium within said reactor tank, a core tank positioned within said reactor tank and surrounded by said sodium, a plurality of process tubes passing through said core tank and defining fuel element positions and sodium coolant passages, said process tubes having their ends sealed to said core tank, a graphite moderator within said core tank and supported in spaced relation to said core tank and said process tubes, a sodium leakage plenum in the bottom of said core tank, a plurality of sleeves, each sleeve being located around and in spaced relation with a process tube, means on the top of said sleeve for collecting sodium leaking through the top of said core vessel and for directing said sodium into said space between said sleeve and said process tube and into said leakage plenum, and means for removing sodium from said leakage plenum.

References Cited in the file of this patent

UNITED STATES PATENTS

| | | |
|---|---|---|
| 2,743,224 | Ohlinger | Apr. 24, 1956 |
| 2,863,815 | Moore et al. | Dec. 9, 1958 |
| 2,915,446 | Liljeblad | Dec. 1, 1959 |
| 2,929,768 | Mahlmeister et al. | Mar. 22, 1960 |
| 2,961,393 | Monson | Nov. 22, 1960 |

FOREIGN PATENTS

| | | |
|---|---|---|
| 754,183 | Great Britain | Aug. 1, 1956 |

OTHER REFERENCES

Mahlmeister: "Preliminary Design of a Calandria Core for the Sodium Reactor Experiment," NAA–SR–2151, Nov. 15, 1957.

Parkins: "International Conference on the Peaceful Uses of Atomic Energy," vol. 3, pp. 295–321, August 1955, U.N. Publication, New York.